(12) United States Patent
Yamato et al.

(10) Patent No.: US 11,100,745 B2
(45) Date of Patent: Aug. 24, 2021

(54) SETTLEMENT PROCESSING SYSTEM, SETTLEMENT PROCESSING DEVICE, AND SETTLEMENT PROCESSING METHOD

(71) Applicant: Rakuten, Inc., Tokyo (JP)

(72) Inventors: Takumi Yamato, Tokyo (JP); Toshiaki Tazume, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 25 days.

(21) Appl. No.: 16/639,988

(22) PCT Filed: Apr. 9, 2019

(86) PCT No.: PCT/JP2019/015512
§ 371 (c)(1),
(2) Date: Feb. 18, 2020

(87) PCT Pub. No.: WO2020/208720
PCT Pub. Date: Oct. 15, 2020

(65) Prior Publication Data
US 2021/0134103 A1  May 6, 2021

(51) Int. Cl.
*G07F 9/00* (2006.01)
*G07F 9/02* (2006.01)
*G07F 5/26* (2006.01)

(52) U.S. Cl.
CPC ............... *G07F 9/009* (2020.05); *G07F 5/26* (2013.01); *G07F 9/006* (2013.01); *G07F 9/026* (2013.01)

(58) Field of Classification Search
CPC . G07F 9/009; G07F 5/26; G07F 9/006; G07F 9/026

USPC .................................................. 700/231–244
See application file for complete search history.

(56) References Cited

U.S. PATENT DOCUMENTS

| 5,728,999 A * | 3/1998 | Teicher ................. G06Q 20/04 235/381 |
| 5,744,787 A | 4/1998 | Teicher |
| 10,546,204 B1 * | 1/2020 | Kumar ............... G06K 9/00671 |
| 10,984,282 B2 * | 4/2021 | Hacker ..................... G06T 7/70 |
| 2004/0188455 A1 * | 9/2004 | Shioya ................. G07F 11/165 221/123 |

(Continued)

FOREIGN PATENT DOCUMENTS

| CN | 208092844 U | 11/2018 |
| JP | 11-506557 A | 6/1999 |
| JP | 2019-503019 A | 1/2019 |

OTHER PUBLICATIONS

International Search Report for PCT/JP2019/015512 dated May 28, 2019 [PCT/ISA/210].

*Primary Examiner* — Michael Collins
(74) *Attorney, Agent, or Firm* — Sughrue Mion, PLLC

(57) ABSTRACT

A settlement processing system S is configured to perform a settlement process for a product picked up by a user based on information for settlement of the user, when closing of a door 12 of a vending machine 1 is detected after opening of the door 12 is detected. In addition, the settlement processing system S is configured to perform the settlement process for the product picked up by the user based on the information for settlement of the user, in a state in which the closing of the door 12 of the vending machine 1 is not detected after the opening of the door 12 is detected, when the state in which the user has moved from the vending machine 1 is detected.

9 Claims, 10 Drawing Sheets

(56) References Cited

U.S. PATENT DOCUMENTS

| | | | | |
|---|---|---|---|---|
| 2010/0237091 A1* | 9/2010 | Garson | .................. | G07F 9/026 |
| | | | | 221/226 |
| 2014/0316916 A1* | 10/2014 | Hay | ........................ | A47F 9/048 |
| | | | | 705/17 |
| 2017/0103515 A1* | 4/2017 | Hulth | ................. | G06K 9/00771 |
| 2017/0148005 A1 | 5/2017 | Murn | | |
| 2017/0177969 A1* | 6/2017 | Zaremski | ............. | G06K 9/4604 |
| 2017/0309136 A1* | 10/2017 | Schoner | .............. | G07G 1/0045 |
| 2019/0050792 A1* | 2/2019 | Kobayashi | ............. | G06Q 30/02 |
| 2019/0354923 A1* | 11/2019 | Taira | ....................... | B60R 11/04 |
| 2020/0005231 A1* | 1/2020 | Nakagawa | ............. | H04W 4/35 |
| 2020/0202177 A1* | 6/2020 | Buibas | ................... | G01S 17/10 |

\* cited by examiner

SETTLEMENT PROCESSING SYSTEM, SETTLEMENT PROCESSING DEVICE, AND SETTLEMENT PROCESSING METHOD

CROSS REFERENCE TO RELATED APPLICATIONS

This application is a National Stage of International Application No. PCT/JP2019/015512 filed Apr. 9, 2019.

TECHNICAL FIELD

The present invention relates to a technical field such as a system configured to automatically execute a settlement process for a product picked up from a vending machine.

BACKGROUND ART

Conventionally, there is known a system that, after a product is picked up from a vending machine, is configured to, in response to an event that a door of the vending machine is closed, automatically executes a settlement process for the product. For example, Patent Literature 1 discloses a vending machine 100 with which, when a customer has picked up an item from a storage and display unit 102, the customer, for example, closes a door of the storage and display unit 102 to cause a purchase complete unit 107 to operate. Then, the purchase complete unit 107 of the vending machine 100 transmits a purchase complete display to an accounting unit 108 that calculates an amount to be paid. With this configuration, the vending machine 100 will reliably return to a state in which an access control unit 106 prevents an access to the storage and display unit 102.

CITATION LIST

Patent Literature

Patent Literature 1: JP H11-506557 A

SUMMARY OF INVENTION

Technical Problem

However, in the conventional system described above, as long as the door of the vending machine is not closed, the settlement process for the product picked up from the vending machine is not executed. Thus, in a case, for example, that a user leaves the vending machine without remembering to close the door, a third party may freely pick up any of the products without making a payment.

In view of the respects described above, an object of the present invention is to provide a settlement processing system, a settlement processing device, and a settlement processing method, each configured to safely complete the settlement process, even when the door of the vending machine is not closed for a period of time.

Solution to Problem

In order to solve the above problem, the invention according to claim 1 is a settlement processing system including: a first detection unit configured to detect an opening or a closing of a door of a vending machine, the vending machine including a storing chamber that stores a product; a product identification unit configured to identify the product that is picked up by a user from the storing chamber after the opening of the door is detected by the first detection unit; a second detection unit configured to detect a state in which the user has moved away from the vending machine, in a state in which the closing of the door is not detected after the opening of the door is detected by the first detection unit; an information acquisition unit configured to acquire information for settlement of the user; a first settlement processing unit configured to perform a settlement process for the product identified by the product identification unit based on the information for settlement of the user, in a case that the closing of the door is detected after the opening of the door is detected by the first detection unit; and a second settlement processing unit configured to perform a settlement process for the product identified by the product identification unit based on the information for settlement of the user, in a case that the state in which the user has moved away is detected by the second detection unit. This makes it possible to safely complete the settlement process even when the door of the vending machine is not closed for a period of time.

The invention according to claim 2 is the settlement processing system according to claim 1, wherein the second settlement processing unit performs the settlement process for the product identified by the product identification unit, in a case that the state, in which the closing of the door is not detected after the opening of the door is detected by the first detection unit, remains for a predetermined period of time or longer, and the state in which the user has moved away is detected by the second detection unit. This makes it possible not only to safely complete the settlement process but also to flexibly cope with a case that, for example, the user temporarily moves away from the vending machine and then returns to the vending machine.

The invention according to claim 3 is the settlement processing system according to claim 1, further including: a distance identification unit configured to identify a distance that the user has moved from away the vending machine, wherein in a case that the distance identified by the distance identification unit is equal to or greater than a first predetermined distance and is less than a second predetermined distance, the second settlement processing unit performs the settlement process for the product identified by the product identification unit, on a condition that the state, in which the closing of the door is not detected, remains for a predetermined period of time or longer, and in a case that the distance identified by the distance identification unit is equal to or greater than the second predetermined distance, the second settlement processing unit performs the settlement process for the product identified by the product identification unit, regardless of whether or not the state, in which the closing of the door is not detected, remains for the predetermined period of time or longer. This makes it possible not only to safely complete the settlement process but also to flexibly cope with a case that, for example, the user eats or drinks the product that the user has picked up in a location slightly away from the vending machine.

The invention according to claim 4 is the settlement processing system according to any one of claims 1 to 3, further including: an authentication processing unit configured to perform an authentication process for a user that uses the vending machine when the door is in a locked state; and a first control unit configured to control to unlock the door in a case that the user is authenticated by the authentication processing unit, wherein each of the first settlement processing unit and the second settlement processing unit performs the settlement process for the product identified by the product identification unit, based on information for settlement of the authenticated user. This makes it possible to prevent the product from being picked up by anyone but an authenticated user and to accurately execute the settlement process for the authenticated user.

The invention according to claim 5 is the settlement processing system according to any one of claims 1 to 4, further including: a second control unit configured to control to prevent the product from being picked up from the storing chamber, in a case that the settlement process for the product is performed by the second settlement processing unit in the state in which the closing of the door is not detected. This makes it possible not only to safely complete the settlement process but also to prevent a third party from removing the product from the storing chamber even in a case that the user has left without remembering to close the door of the vending machine.

The invention according to claim 6 is the settlement processing system according to claim 5, wherein the second control unit controls to automatically close the door based on a drive mechanism including a motor. This makes it possible to prevent the third party from removing the product from the storing chamber without additionally providing any complex mechanism for product removal prevention to the vending machine.

The invention according to claim 7 is the settlement processing system according to claim 5, wherein the second control unit controls to automatically close an inner door that is provided between the storing chamber and the door, based on a drive mechanism including a motor. This makes it possible to prevent the third party from removing the product from the storing chamber even in a case that the door of the vending machine is not closed for some reason.

The invention according to claim 8 is A settlement processing device including: a first detection unit configured to detect an opening or a closing of a door of a vending machine, the vending machine including a storing chamber that stores a product; a product identification unit configured to identify the product that is picked up by a user from the storing chamber after the opening of the door is detected by the first detection unit; a second detection unit configured to detect a state in which the user has moved away from the vending machine, in a state in which the closing of the door is not detected after the opening of the door is detected by the first detection unit; an information acquisition unit configured to acquire information for settlement of the user; a first settlement processing unit configured to perform a settlement process for the product identified by the product identification unit based on the information for settlement of the user, in a case that the closing of the door is detected after the opening of the door is detected by the first detection unit; and a second settlement processing unit configured to perform a settlement process for the product identified by the product identification unit based on the information for settlement of the user, in a case that the state in which the user has moved away is detected by the second detection unit.

The invention according to claim 9 is a settlement processing method executed by one or more computers, the settlement processing method including: a step of detecting an opening or a closing of a door of a vending machine, the vending machine including a storing chamber that stores a product; a step of identifying the product that is picked up by a user from the storing chamber after the opening of the door is detected; a step of detecting a state in which the user has moved away from the vending machine, in a state in which the closing of the door is not detected after the opening of the door is detected; a step of acquiring information for settlement of the user; a step of performing a settlement process for the product identified based on the information for settlement of the user, in a case that the closing of the door is detected after the opening of the door is detected; and a step of performing a settlement process for the product identified based on the information for settlement of the user, in a case that the state in which the user has moved away is detected.

Advantageous Effect of the Invention

According to the present invention, it is possible to safely complete the settlement process even when the door of the vending machine is not closed for a period of time.

DESCRIPTION OF EMBODIMENTS

A settlement processing system according to an embodiment of the present invention will be described in detail below with reference to the drawings.

Figure 1:
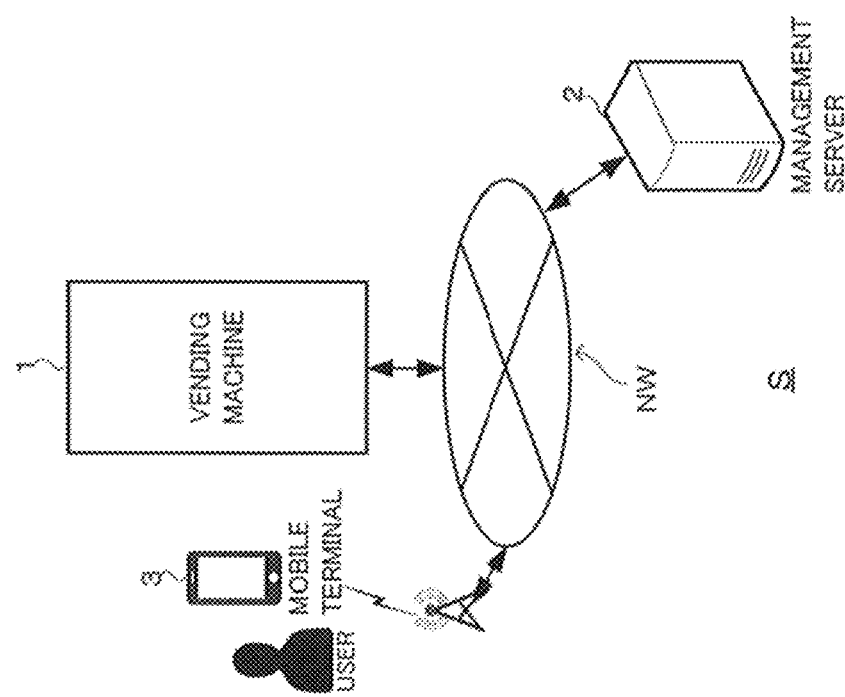
FIG. 1 is a diagram illustrating a schematic configuration example of a settlement processing system S according to this embodiment.

1. Schematic Configuration and Schematic Function of Settlement Processing System S First, a schematic configuration and a schematic function of a settlement processing system S according to this embodiment will be described with reference to FIG. 1 and others. FIG. 1 is a diagram illustrating a schematic configuration example of the settlement processing system S according to this embodiment. As illustrated in FIG. 1, the settlement processing system S includes a vending machine 1, a management server 2, and others. The vending machine 1 can communicate with the management server 2 via a communication network NW. Moreover, a user of the vending machine 1 possesses a mobile terminal 3 having a settlement application installed. The mobile terminal 3 can also communicate with the management server 2 via the communication network NW at settlement for a product. The communication network NW may be, for example, a leased line, an internet, a mobile communication network, or the like. Moreover, the vending machine 1 can perform near-field communication (e.g., near-field communication based on a wireless LAN or Bluetooth (registered trademark) standard) with the mobile terminal 3. The mobile terminal 3 is, for example, a smartphone, a mobile phone, a tablet, a mobile game machine, or the like.

Incidentally, although an installation place of the vending machine 1 is not particularly limited, it is installed, for example, in a building where people can enter and exit. In the example of FIG. 1, the vending machine 1 is illustrated as a single vending machine. Alternatively, the vending machine 1 may be in plural, each provided at a different location. Moreover, the management server 2 manages and controls the vending machine 1. In addition, the management server 2 manages an account of the user, performs an authentication process for the user, and performs a settlement process for the product. The management server 2 may be a single server or may be constituted by a plurality of servers. Moreover, the management server 2 may be divided into two servers: one manages and controls the vending machine 1, while the other manages the account of the user, performs the authentication process for the user, and performs the settlement process for the product.

Figure 2:
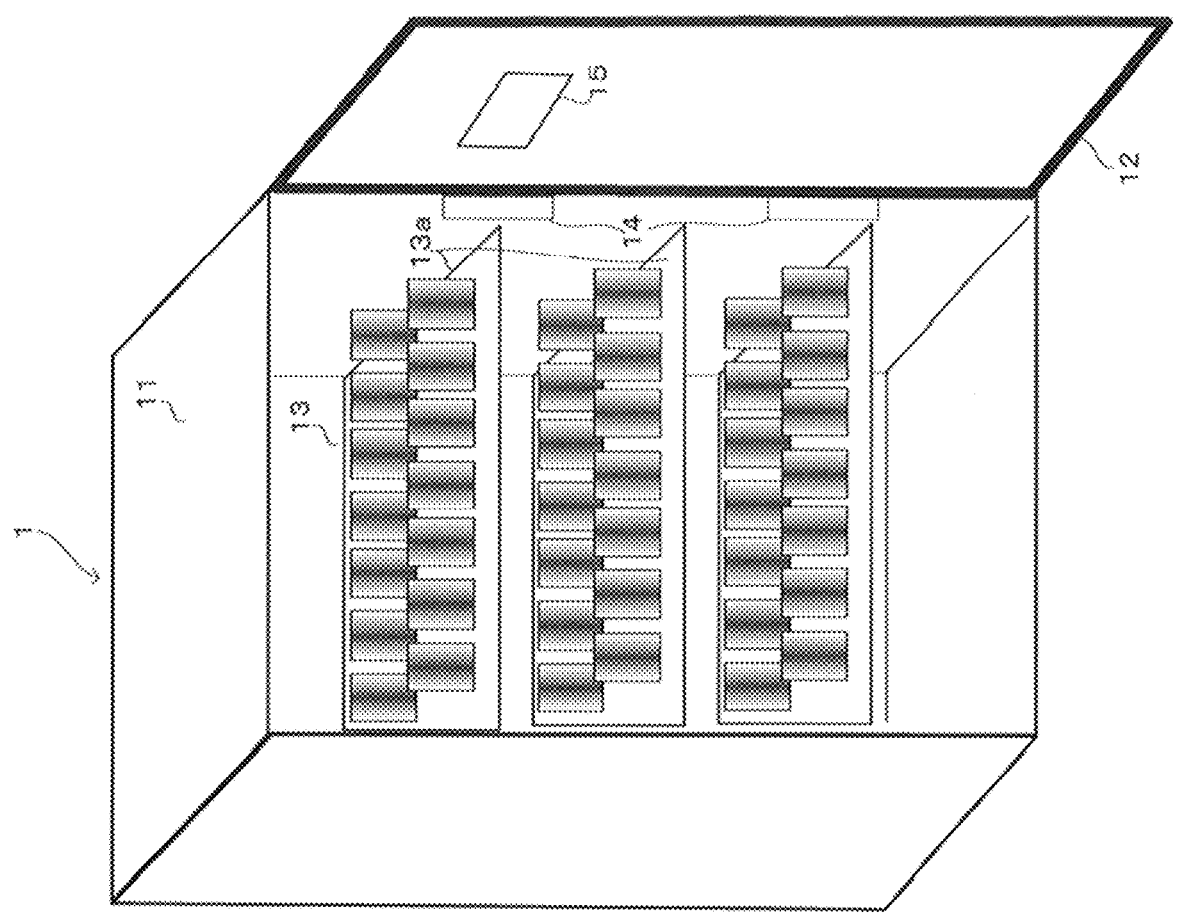
FIG. 2 illustrates external perspective views of a vending machine 1.
Figure 2:
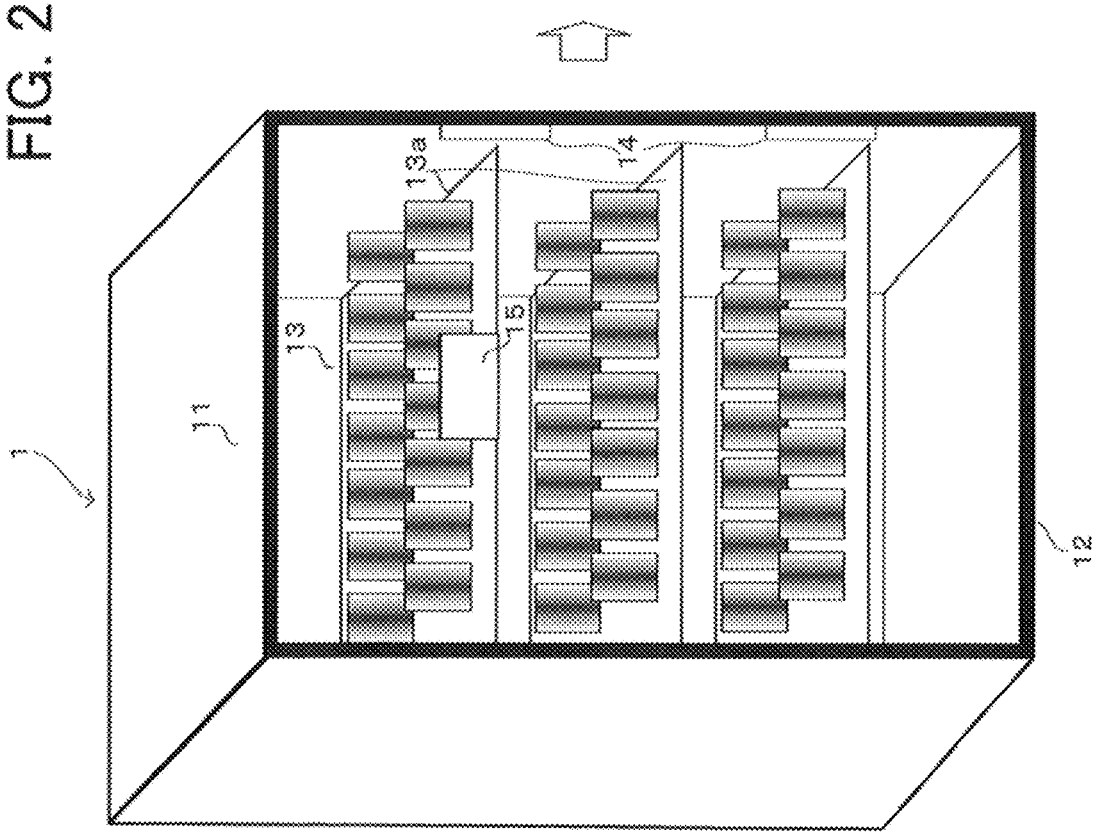

FIG. 2 illustrates external perspective views of the vending machine 1. As illustrated in FIG. 2, the vending machine 1 includes a main body 11, a door 12, a storing chamber 13, a hinge mechanism (not illustrated), a lock/unlock mechanism (not illustrated), a door drive mechanism 14, and a display 15. The main body 11 includes an open space; the door 12 covers the open space of the main body 11; the storing chamber 13 stores each product; the hinge mechanism connects the main body 11 with the door 12; the lock/unlock mechanism locks and/or unlocks the door 12; and the door drive mechanism 14 automatically closes the door 12 (and includes a motor (not illustrated) or the like).

The door 12 is formed of, for example, a transparent glass material, and thus each product displayed on a shelf 13a in the storing chamber 13 is visible even when the door 12 is closed. The door 12 is mounted to an end edge of the open space of the main body 11 with the hinge mechanism so as to be open or closed. Moreover, when the door 12 is locked by the lock/unlock mechanism (i.e., when the door 12 is in a locked state), the user of the vending machine 1 may not open the door 12. On the other hand, when the door 12 is unlocked, the user of the vending machine 1 may operate a handle (not illustrated) provided on the door 12 to open the door 12, as illustrated on the right of FIG. 2.

The display 15 is mounted to, for example, an inside (e.g., a glass surface) of the door 12 of the vending machine 1. The display 15 is configured to display a name, a sales price, and others of the product picked up by the user from the storing chamber 13. Incidentally, while not illustrated, the vending machine 1 may include, outside the door 12, a display or the like to display a two-dimensional code such as a QR code (registered trademark) having a vending machine ID (identification information of the vending machine 1) of the vending machine 1.

Figure 3:
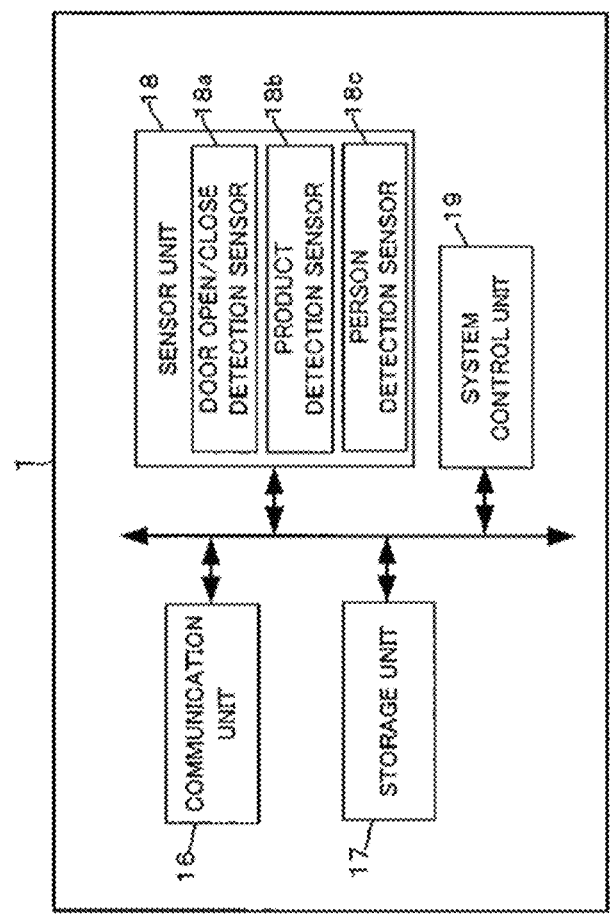
FIG. 3 is a diagram illustrating a functional configuration example of the vending machine 1.

FIG. 3 is a diagram illustrating a functional configuration example of the vending machine 1. As illustrated in FIG. 3, the vending machine 1 includes a communication unit 16, a storage unit 17, a sensor unit 18, and a system control unit 19. The communication unit 16 is configured to control communication performed via the communication network NW, and to control the near-field communication performed with the mobile terminal 3. The storage unit 17 may be, for example, a hard disk drive, and stores a vending machine processing program or the like. Moreover, the storage unit 17 also stores product information of each product stored in the storing chamber 13. The product information includes, for example, information such as a product ID (product identification information), the name, the sales price, a weight, and a photographic image of the product. The sensor unit 18 includes a door open/close detection sensor 18a, a product detection sensor 18b, a person detection sensor 18c, and the like.

The door open/close detection sensor 18a is configured to detect opening/closing of the door 12 of the vending machine 1. The door open/close detection sensor 18a is mounted to, for example, a border between the main body 11 and the door 12. The door open/close detection sensor 18a outputs an open signal (ON signal) to the system control unit 19 when the door 12 is open (the door 12 is in an open state), while outputting a close signal (OFF signal) to the system control unit 19 when the door 12 is closed (the door 12 is in a closed state). This configuration enables the system control unit 19 to detect the opening/closing of the door 12 of the vending machine 1. Incidentally, the door open/close detection sensor 18a may be a temperature sensor for measuring a temperature of the storing chamber 13. In this case, the door open/close detection sensor 18a outputs temperature data indicating the temperature measured to the system control unit 19.

The product detection sensor 18b is configured to detect the product picked up from the storing chamber 13 of the vending machine 1, or to detect a product returned to the storing chamber 13 after being picked up from the storing chamber 13. The product detection sensor 18b may be a camera or a weight sensor. When the product detection sensor 18b is the camera, the product detection sensor 18b is mounted in a vicinity of the open space of the main body 11. In this case, the product detection sensor 18b outputs, to the system control unit 19, image data of a range (the range within which the open space and the storing chamber 13 of the vending machine 1 are included) continuously captured by the camera. By this configuration, based on the image data, the system control unit 19 can detect the product picked up or the product returned after being picked up.

Alternatively, when the product detection sensor 18b is the weight sensor, the product detection sensor 18b is mounted in a location where the products are placed inside the storing chamber 13 (the shelf 13a of the storing chamber 13 in the example of FIG. 3). In this case, the product detection sensor 18b outputs weight data continuously detected by the weight sensor to the system control unit 19. By this configuration, based on the weight data, the system control unit 19 can detect the product picked up or the product returned after being picked up.

The person detection sensor 18c is configured to detect and track a person (i.e., the user) that has opened the door 12 of the vending machine 1. The person detection sensor 18c may preferably be a camera. Particularly, when the person detection sensor 18c is a 3D camera, it is possible to track the user as a subject and measure a distance to the user (measure the distance based on, for example, a time-of-flight (TOF) method). The person detection sensor 18c is mounted in the vicinity of the open space of the main body 11. The person detection sensor 18c outputs, to the system control unit 19, image data (when the 3D camera is used, the image data includes distance information measured per pixel of the image data) in a range whose image is continuously captured by the camera (a range in a direction that the user moves away from the open space of the vending machine 1). By this configuration, based on the image data, the system control unit 19 can detect and track the user that has opened the door 12. Incidentally, the person detection sensor 18c may be an infrared sensor, an ultrasonic sensor, a laser detection and ranging (LADAR) system, or the like.

Figure 4:
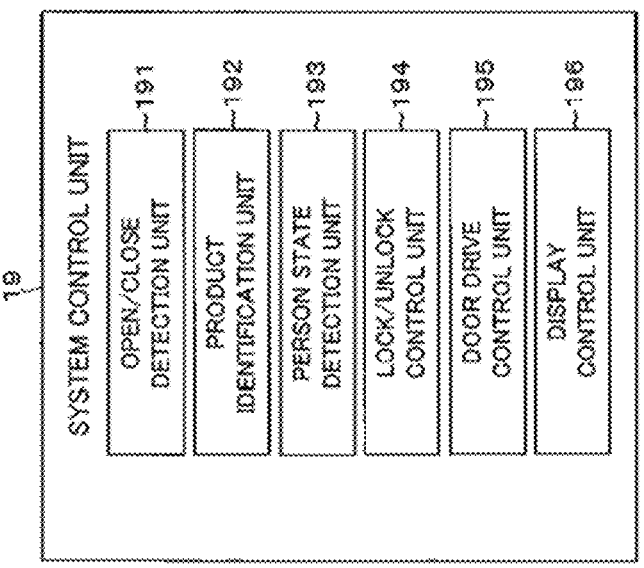
FIG. 4 is a diagram illustrating a functional configuration example of a system control unit 19.

The system control unit 19 (an example of a computer) includes a central processing unit (CPU), a read only memory (ROM), a random access memory (RAM), and others. FIG. 4 is a diagram illustrating a functional configuration example of the system control unit 19. The system control unit 19 (a processor in the system control unit 19) executes, for example, the vending machine processing program stored in the storage unit 17 to function as illustrated in FIG. 4, that is, to function as an open/close detection unit 191, a product identification unit 192, a person state detection unit 193, a lock/unlock control unit 194, a door drive control unit 195, and a display control unit 196. Here, the open/close detection unit 191 corresponds to an example of a first detection unit; and the person state detection unit 193 corresponds to an example of a second detection unit and an example of a distance measurement unit. The lock/unlock control unit 194 corresponds to an example of a first control unit. The door drive control unit 195 corresponds an example of a second control unit.

The open/close detection unit 191 detects the opening (the open state) of the door 12 of the vending machine 1 based on the open signal input from the door open/close detection sensor 18*a*. Here, the open state of the door 12 may be detected when the open signal remains on for a predetermined period of time or longer (when a duration of the open signal is longer than the predetermined period). Moreover, the open/close detection unit 191 detects the closing (the closed state) of the door 12 of the vending machine 1 based on the close signal input from the door open/close detection sensor 18*a*. Here, the closed state of the door 12 may be detected when the close signal remains on for a predetermined period of time or longer (when a duration of the close signal is longer than the predetermined period).

Alternatively, the open/close detection unit 191 may detect the opening/closing of the door 12 of the vending machine 1 based on temperature data input from the door open/close detection sensor 18*a*. For example, the open/close detection unit 191 detects the closing of the door 12 of the vending machine 1 when the temperature data indicates a temperature below a threshold value, and detects the opening of the door 12 of the vending machine 1 when the temperature data indicates a temperature above the threshold value. Incidentally, door open/close information indicating the opening/closing detected by the open/close detection unit 191, is transmitted to the management server 2 via the communication network NW.

Based on the image data input from the product detection sensor 18*b*, the product identification unit 192 detects the product picked up by the user from the storing chamber 13 after the opening of the door 12 is detected or detects the product returned to the storing chamber 13 after being picked up from the storing chamber 13, and identifies the product by image recognition. Here, machine learning (AI) may preferably be employed for the image recognition. In this case, the product identification unit 192 identifies the product from the image data input from the product detection sensor 18*b* by using a learning model in which features of image data are learned for each label based on a combination of a large number of image data and labels (information indicating what the image data represents).

Alternatively, based on the weight data input from the product detection sensor 18*b*, the product identification unit 192 may detect the product picked up from the storing chamber 13 or the product returned to the storing chamber 13 after being picked up from the storing chamber 13, and identify the product based on a change in the weight. In this case, the product identification unit 192 previously stores arrangement information on where each product is located on the shelf 13*a* (i.e., information indicating which of the products is in which position). The product identification unit 192 detects the product positioned in a location where the weight has changed on the shelf 13*a* based on the weight data and identifies the product picked up or the product returned after being picked up based on the arrangement information. Incidentally, product information indicating the product (the product picked up or the product returned after being picked up) identified by the product identification unit 192, is transmitted to the management server 2 via the communication network NW.

The person state detection unit 193 detects and tracks the user that has opened the door 12 based on the image data input from the person detection sensor 18*c* (i.e., recognizes and tracks the person based on the image data) after the opening of the door 12 is detected by the open/close detection unit 191. Then, in a state in which the closing of the door 12 is not detected (when the closing of the door 12 has not been detected), the person state detection unit 193 detects a state in which the detected user has moved away from the vending machine 1. For example, the person state detection unit 193 is configured to detect the following condition as a state in which the user has moved away from the vending machine 1, the condition is that the user to be tracked is not detected from the image data, a size of the user to be tracked in the image data is reduced to below the threshold value. As another example, when the vending machine 1 has started the near-field communication with the mobile terminal 3 (i.e., the mobile terminal 3 possessed by the near-field communication with the mobile terminal 3, the person state detection unit 193 may detect the state in which the user has moved away from the vending machine 1. Incidentally, moving state information indicating the state (the state detected by the person state detection unit 193) in which the user has moved away, is transmitted to the management server 2 via the communication network NW.

Moreover, when the person detection sensor 18*c* is the 3D camera, the person state detection unit 193 may continuously identify a distance that the user has moved away from the vending machine 1 (i.e., the distance from the vending machine 1 to the user) based on the image data (including distance information) input from the 3D camera. In this case, the person state detection unit 193 may be configured to detect the state in which the user has moved away from the vending machine 1, when the distance continuously identified (e.g., an average of the distances identified at a plurality of times) reaches or exceeds a predetermined distance. As another example, the distance from the vending machine 1 to the user may be measured by a distance sensor such as the laser detection and ranging (LADAR) system. Incidentally, the distance information indicating the distance identified by the person state detection unit 193, is transmitted to the management server 2 via the communication network NW.

The lock/unlock control unit 194 controls to lock/unlock the door 12. For example, when receiving an unlock command from the management server 2, the lock/unlock control unit 194 controls to unlock the door 12 by outputting an unlock control signal to the lock/unlock mechanism. On the other hand, when receiving a lock command from the management server 2, the lock/unlock control unit 194 controls to lock the door 12 by outputting a lock control signal to the lock/unlock mechanism.

The door drive control unit 195 controls to prevent any of the products from being picked up from the storing chamber 13. For example, when receiving a close command from the management server 2, the door drive control unit 195 controls to automatically close the door 12 by outputting a close control signal to the door drive mechanism 14.

When the product identification unit 192 identifies the product picked up from the storing chamber 13, the display control unit 196 displays the name, the sales price, and the like of the identified product on the display 15. This configuration enables the user to confirm the name, the sales price, and the like of the product that the user has picked up from the storing chamber 13 before closing the door 12 to proceed to the settlement for the product. Moreover, when the product identification unit 192 identifies the product returned to the storing chamber 13 after being picked up from the storing chamber 13, the display control unit 196 deletes the name, the sales price, and the like of the product identified from the display 15.

Figure 5:
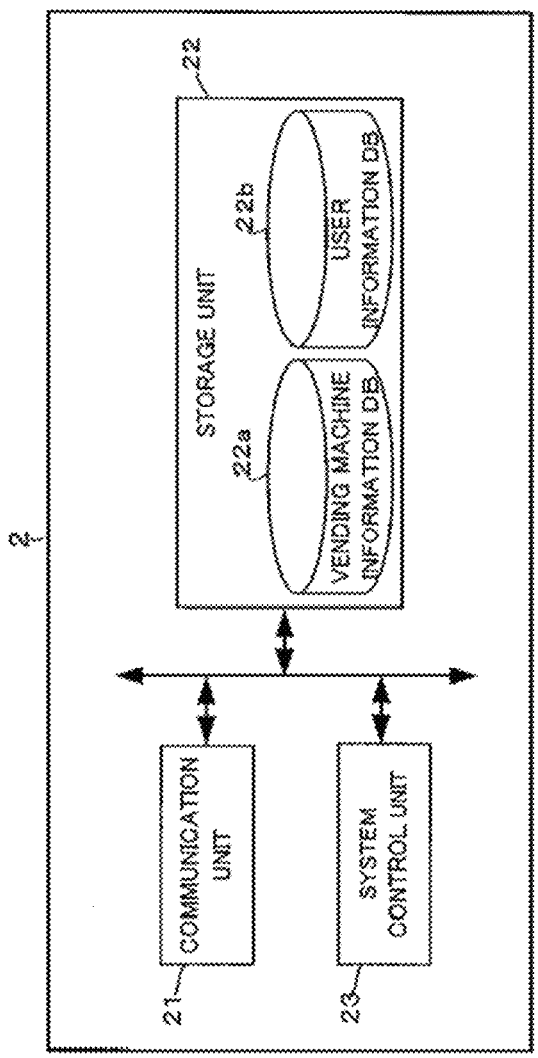
FIG. 5 is a diagram illustrating a functional configuration example of a management server 2.

FIG. 5 is a diagram illustrating a functional configuration example of the management server 2. As illustrated in FIG. 5, the management server 2 includes a communication unit 21, a storage unit 22, and a system control unit 23. The management server 2 corresponds to an example of a settlement processing device. The communication unit 21 is configured to control communication performed via the communication network NW. The communication unit 21 receives the door open/close information, the product information, the moving state information, the distance information, and the like transmitted from the vending machine 1. The storage unit 22 is, for example, a hard disk drive, and stores a management server program or the like. Moreover, in the storage unit 22, a vending machine information database (DB) 22*a*, a user information database (DB) 22*b*, and the like are constructed.

The vending machine information database 22*a* stores the vending machine ID of the vending machine 1, the product information of the products stored in the vending machine 1, an IP address of the vending machine 1, and the like, all of which are stored in correspondence to each of the vending machines 1. The user information database 22*b* stores a UID (i.e., user identification information), a password, a name, a phone number, an e-mail address, information for settlement, and the like, all of which are stored in correspondence to each of the users having an account. Here, each of the UID and the password of the user is used for the authentication process for the user. The information for settlement is used for the settlement process for the product to be purchased by the user. The information for settlement includes information corresponding to a settlement method available to the user.

The settlement method available includes, for example, a credit card settlement, an electronic money settlement, and a direct debit settlement. When the settlement method available is the credit card settlement, the information for settlement includes a number, a name, an expiry date, a credit limit (credit line), an amount available for use (a balance of the credit limit from which an amount used in the month is deducted) of the credit card, and the like, together with account information. When the settlement method available is the electronic money settlement, the information for settlement includes a number, a value balance, and the like of the electronic money. When the settlement method available is the direct debit settlement, the information for settlement includes a number, a name, an expiry date of the debit card, and the like, together with account information. Incidentally, the information for settlement of the user may be controlled and managed by a server (e.g., a credit card settlement processing server, an electronic money settlement processing server, or a direct debit settlement processing server) corresponding to the settlement method. In this case, the management server 2 communicates with the server corresponding to the settlement method as needed, and acquires the information for settlement of the user.

Figure 6:
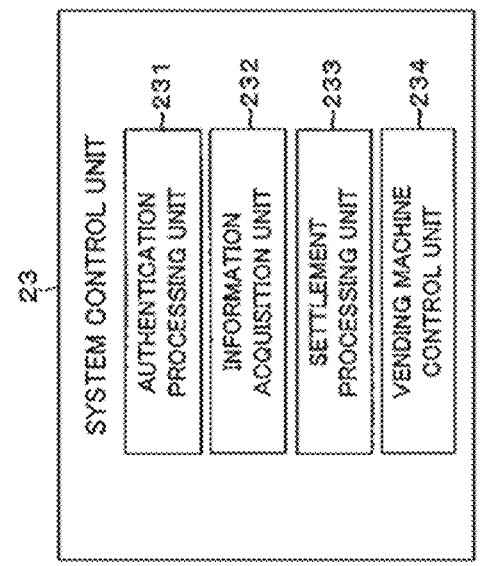
FIG. 6 is a diagram illustrating a functional configuration example of a system control unit 23.

The system control unit 23 (an example of the computer) includes a CPU, a ROM, a RAM, and others. FIG. 6 is a diagram illustrating a functional configuration example of the system control unit 23. Incidentally, the system control unit 23 recognizes the opening/closing of the door 12 based on the door open/close information received from the vending machine 1. Moreover, the system control unit 23 recognizes the product picked up from the storing chamber 13 or the product returned to the storing chamber 13 based on the product information received from the vending machine 1. Moreover, the system control unit 23 recognizes the state in which the user has moved away from the vending machine 1, based on the moving state information received from the vending machine 1. Moreover, the system control unit 23 recognizes the distance from the vending machine 1 to the user based on the distance information received from the vending machine 1.

Further, the system control unit 23 (a processor in the system control unit 23) executes, for example, the management server program stored in the storage unit 22 to function as illustrated in FIG. 6, that is, to function as an authentication processing unit 231, an information acquisition unit 232, a settlement processing unit 233, and a vending machine control unit 234. Here, the settlement processing unit 233 corresponds to an example of a first settlement processing unit and an example of a second settlement processing unit. The vending machine control unit 234 controls to lock/unlock the door 12 in cooperation with the lock/unlock control unit 194 of the vending machine 1, and controls to prevent any of the products from being picked up in cooperation with the door drive control unit 195 of the vending machine 1.

With the door 12 in the locked state, the authentication processing unit 231 performs the authentication process for the user when, for example, an authentication request is made from the mobile terminal 3 of the user using the vending machine 1. Here, the authentication request includes the vending machine ID of the vending machine 1 that the user uses, together with the UID, the password of the user, and the like. The authentication process for the user determines, for example, whether or not a pair of the UID and the password included in the authentication request is stored (registered) in the user information database 22*b*. In other words, the authentication process determines whether or not the user related to the authentication request has the information for settlement. Then, when the pair of the UID and the password is stored, the user is authenticated (successful authentication). On the other hand, when the pair of the UID and the password is not stored, the user fails to be authenticated (unsuccessful authentication). By this configuration, it is possible to prevent any of the products from being picked up by anyone but the authenticated user and to accurately execute the settlement process for the authenticated user.

Incidentally, when the pair of the UID and the password included in the authentication request is stored, the authentication process for the user may further determine whether or not the user has a payment capability. Then, when the user has the payment capability, the authentication process results in the successful authentication. For example, when the credit card settlement is specified as the settlement method for the user, a credit inquiry for the user is performed. When the credit of the user is approved (i.e., the user has the payment capability), the authentication process results in the successful authentication. For example, when the credit inquiry confirms that the expiry date has not expired and the amount available for use is equal to or greater than a predetermined amount, the credit of the user is approved. Alternatively, when the electronic money settlement is specified as the settlement method for the user, the authentication process results in the successful authentication on a condition that the value balance of the electronic money is equal to or greater than a predetermined amount. Incidentally, the authentication request may be transmitted from the vending machine 1 that has acquired the UID and the password of the user to the management server 2. In this case, the vending machine 1 acquires the UID and the password of the user from the mobile terminal 3 via, for example, the near-field communication.

The information acquisition unit 232 uses the UID of the user as a key to acquire, from the user information database 22b, the information for settlement of the user that the authentication processing unit 231 has authenticated. When the closing of the door 12 of the vending machine 1 is detected after the opening of the door 12 is detected, the settlement processing unit 233 performs the settlement process for the product (i.e., the product picked up during a period between the opening and the closing of the door 12) picked up based on the information for settlement acquired by the information acquisition unit 232. That is, the settlement process is performed for the product to be purchased by the user. In the settlement process for the product, a payment process for an amount corresponding to the sales price of the product (i.e., a process to require the user to pay for the amount) is performed in accordance with the settlement method that is included in the information for settlement acquired by the information acquisition unit 232.

Moreover, in a state in which the closing of the door 12 of the vending machine 1 is not detected after the opening of the door 12 is detected, when the state in which the user has moved away from the vending machine 1 is detected, the settlement processing unit 233 performs the settlement process for the product picked up (i.e., the product picked up during a period from a time when the door 12 is opened to a time when the user moves away). The settlement process is performed based on the information for settlement acquired by the information acquisition unit 232. Incidentally, when the closing of the door 12 of the vending machine 1 is not detected after the opening of the door 12 is detected for a predetermined period of time or longer, and the state in which the user has moved away from the vending machine 1 is detected, the settlement processing unit 233 may perform the settlement process for the product picked up during the period from a time when the door 12 is opened to a time when the user moves away.

When the authentication processing unit 231 authenticates the user related to the authentication request (in a case of the successful authentication), the vending machine control unit 234 transmits the unlock command of the door 12 to the vending machine 1 (i.e., the vending machine 1 identified based on the vending machine ID included in the authentication request) via the communication network NW. Moreover, when the closing of the door 12 of the vending machine 1 is detected, the vending machine control unit 234 transmits the lock command of the door 12 to the vending machine 1 via the communication network NW. Moreover, in a state in which the closing of the door 12 of the vending machine 1 is not detected, when the settlement processing unit 233 has performed the settlement process for the product, the vending machine control unit 234 transmits the close command of the door 12 to the vending machine 1 via the communication network NW.

2. Operation of Settlement Processing System S

Figure 7:
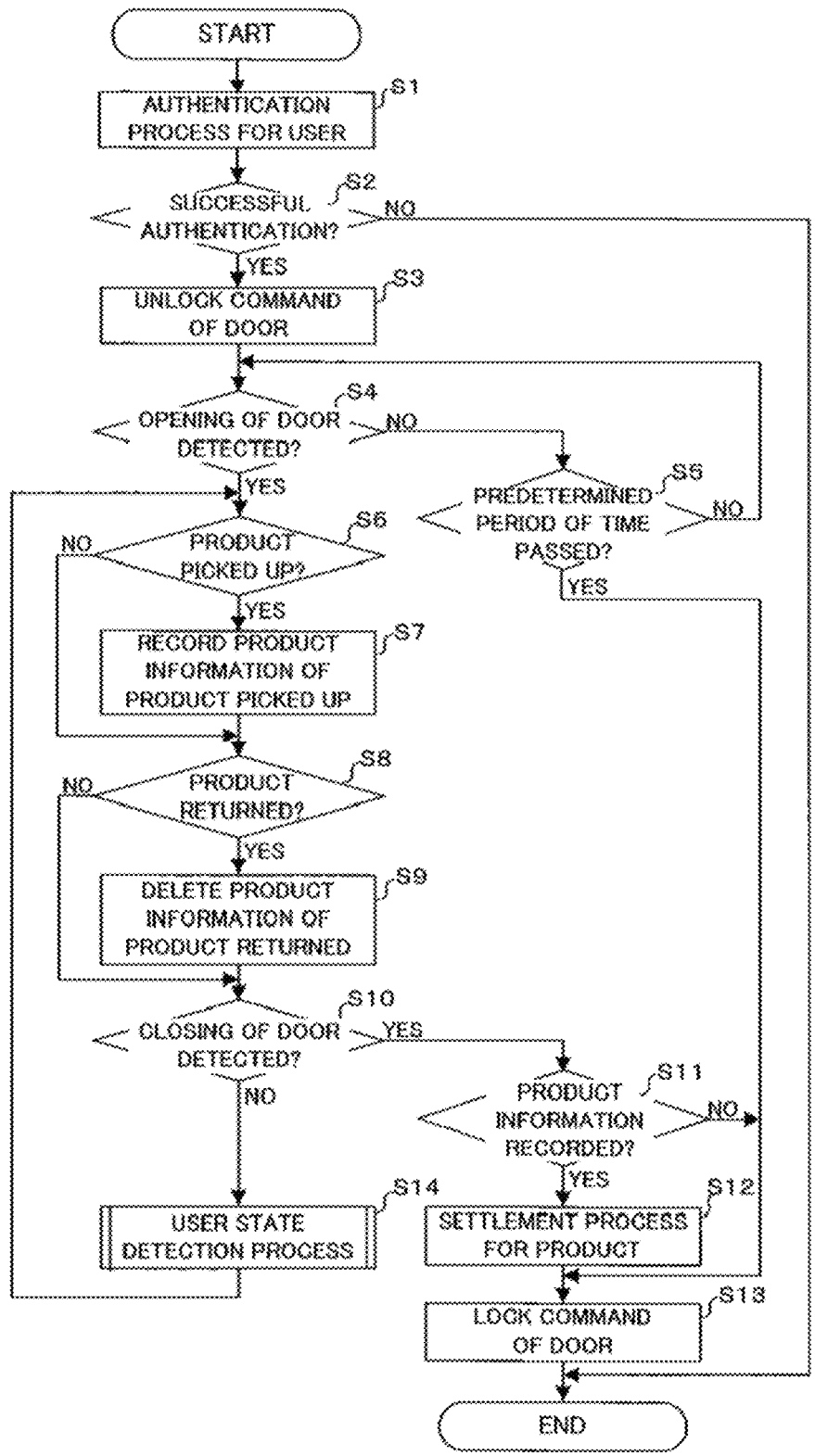
FIG. 7 is a flowchart illustrating an example of a process of the management server 2.
Figure 8:
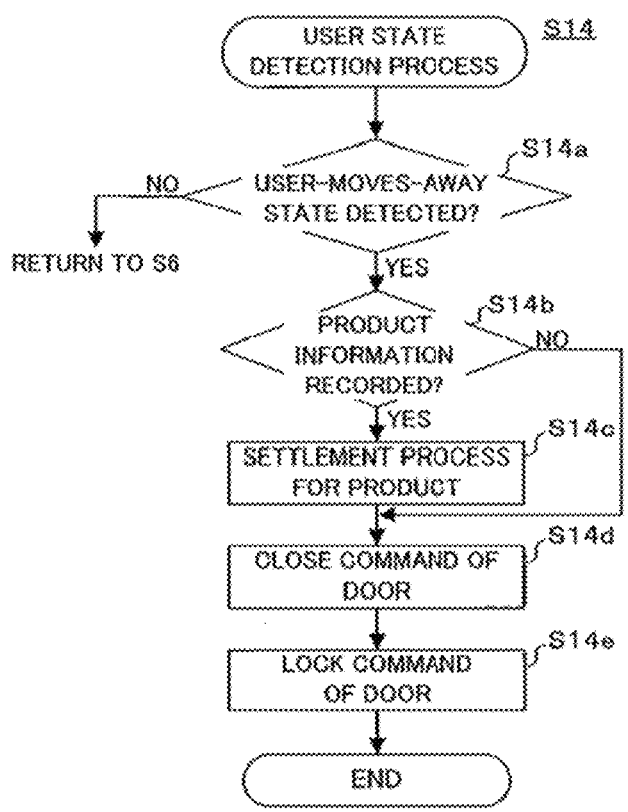
FIG. 8 is a flowchart illustrating a process example 1 of step S14 in FIG. 7.
Figure 9:
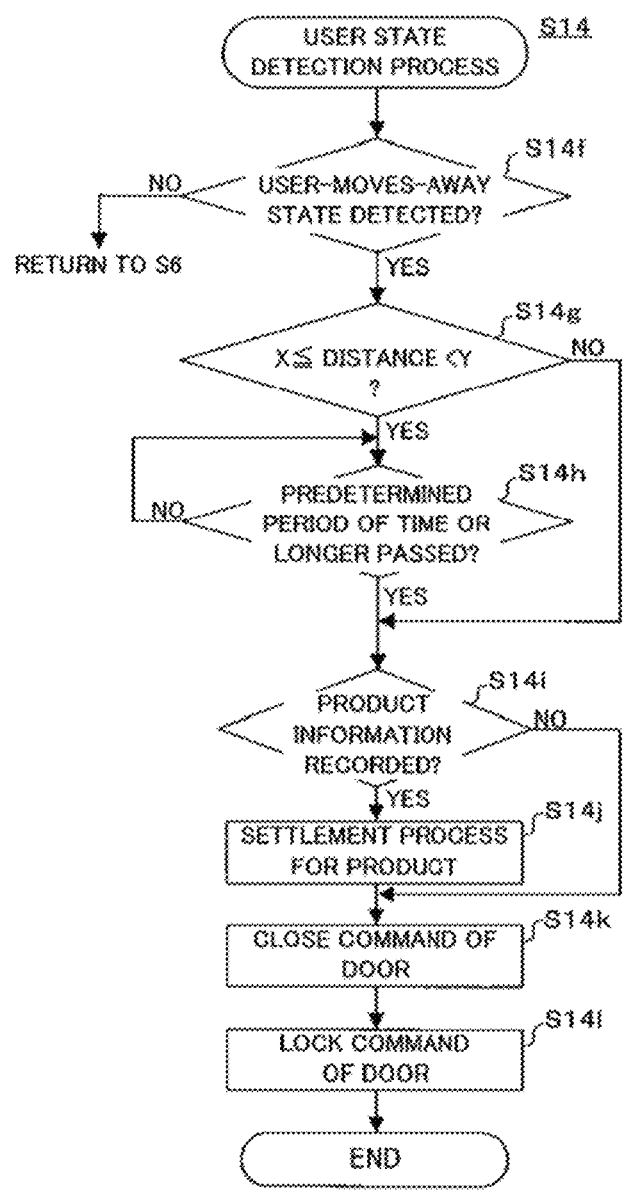
FIG. 9 is a flowchart illustrating a process example 2 of step S14 in FIG. 7.

Next, an operation of the settlement processing system S will be described with reference to FIG. 7, FIG. 8, and FIG. 9. FIG. 7 is a flowchart illustrating an example of a process of the management server 2. FIG. 8 is a flowchart illustrating a process example 1 of step S14 in FIG. 7, and FIG. 9 is a flowchart illustrating a process example 2 of step S14 in FIG. 7.

First, the user possessing the mobile terminal 3 moves to the door 12 of the vending machine 1, and starts the settlement application on the mobile terminal 3 to acquire the vending machine ID from the vending machine 1. Here, the mobile terminal 3 uses its camera to read the two-dimensional code displayed on the display of the door 12 of the vending machine 1 so as to acquire the vending machine ID of the vending machine 1. Alternatively, the mobile terminal 3 may use its near-field communication unit to receive a wireless signal (e.g., Bluetooth low energy (BLE) beacon signal) that includes the vending machine ID and is transmitted from the communication unit 16 of the vending machine 1, so as to acquire the vending machine ID of the vending machine 1. Then, the mobile terminal 3 uses the settlement application to access the management server 2 via the communication network NW. The mobile terminal 3 transmits, to the management server 2, the vending machine ID acquired from the vending machine 1 together with the authentication request including the UID and the password, each registered by the settlement application. In this state, the door 12 of the vending machine 1 remains locked.

When receiving the authentication request from the vending machine 1, the management server 2 starts the process illustrated in FIG. 7. When the process illustrated in FIG. 7 starts, the authentication processing unit 231 of the management server 2 performs the authentication process for the user (step S1). When the authentication process results in the successful authentication (step S2: YES), the information acquisition unit 232 acquires the information for settlement of the authenticated user from the user information database 22b. Then, the process proceeds to step S3. The authentication process results in the successful authentication when, for example, the pair of the UID and the password included in the authentication request is stored in the user information database 22b. On the other hand, when the authentication process results in the unsuccessful authentication (step S2: NO), the process illustrated in FIG. 7 ends.

In step S3, the vending machine control unit 234 of the management server 2 transmits the unlock command of the door 12 to the vending machine 1 via the communication network NW. In other words, the vending machine control unit 234 serves as the first control unit and controls to unlock the door 12 of the vending machine 1 by transmitting the unlock command. The lock/unlock control unit 194 of the vending machine 1 controls to unlock the door 12 in response to the unlock command. By this configuration, the door 12 of the vending machine 1 is unlocked. Incidentally, in step S3, the system control unit 23 transmits the unlock command, and starts a timer A1 and a timer A2, each having different set time. Each of the timer A1 and the timer A2 will be used in a process to be described later.

Next, the system control unit 23 of the management server 2 determines whether or not the opening of the door 12 of the vending machine 1 has been detected (step S4). In the vending machine 1, when the user opens the door 12 by operating a handle provided on the door 12, the open/close detection unit 191 of the vending machine 1 detects the opening of the door 12 of the vending machine 1. Then, the door open/close information indicating the opening of the door 12 is transmitted to the management server 2 via the communication network NW. Incidentally, the person state detection unit 193 of the vending machine 1 is configured to, when the user opens the door 12, detect and tract the user that opens the door 12 based on, for example, the image data input from the person detection sensor 18c.

Then, when receiving the door open/close information indicating the opening of the door 12 from the vending machine 1, the system control unit 23 of the management server 2 determines that the opening of the door 12 of the vending machine 1 has been detected (step S4: YES). Then, the process proceeds to step S6. In other words, the system control unit 23 serves as the first detection unit and detects the opening of the door 12 of the vending machine 1 based on the door open/close information. Incidentally, when the system control unit 23 of the management server 2 determines that the opening of the door 12 has been detected, the system control unit 23 may start the timer A1 and the timer A2. On the other hand, when the system control unit 23 of the management server 2 determines that the opening of the door 12 of the vending machine 1 has not been detected (step S4: NO), the process proceeds to step S5.

In step S5, the system control unit 23 of the management server 2 determines whether or not a predetermined period of time has passed after the unlock command is transmitted. For example, the system control unit 23 determines that the predetermined period of time has passed (step S5: YES) when, for example, the timer A1 counts up the set time (e.g., approximately 30 to 60 seconds). Then, the process proceeds to step S13. On the other hand, when the system control unit 23 determines that the predetermined period of time has not passed (step S5: NO), the process returns to step S4.

In step S6, the system control unit 23 of the management server 2 determines whether or not the user has picked up a product from the storing chamber 13. In the vending machine 1, when the user picks up the product from the storing chamber 13, the product identification unit 192 of the vending machine 1 identifies the product picked up, by the image recognition (or identifies the product based on the change in the weight). Then, the product information of the product (including a flag or the like indicating that the product has been picked up) is transmitted to the management server 2 via the communication network NW. In this state, the display control unit 196 of the vending machine 1 displays the name, the sales price of the product identified (picked up), and the like on the display 15.

Then, when receiving the product information of the product identified (picked up) as above from the vending machine 1, the system control unit 23 of the management server 2 determines that the product has been picked up (step S6: YES), and records the product information of the product picked up (step S7). Then, the process proceeds to step S8. In other words, the system control unit 23 serves as a product identification unit and identifies the product picked up from the storing chamber 13 based on the product information recorded. Here, the product information is recorded by, for example, being recorded (registered) in a list of products to be settled. On the other hand, when the system control unit 23 of the management server 2 determines that the product has not been picked up from the storing chamber 13 (step S6: NO), the process proceeds to step S8.

In step S8, the system control unit 23 of the management server 2 determines whether or not the product picked up by the user is returned to the storing chamber 13. In the vending machine 1, when the user returns the product (that the user has picked up) to the storing chamber 13, the product identification unit 192 of the vending machine 1 identifies the returned product by the image recognition (or identifies the product based on the change in the weight). Then, the product information of the product (including a flag or the like indicating that the product is returned) is transmitted to the management server 2 via the communication network NW. In this state, the display control unit 196 of the vending machine 1 deletes the name, the sales price of the product identified (picked up), and the like from the display 15.

Then, when receiving the product information of the product identified (returned) as above from the vending machine 1, the system control unit 23 of the management server 2 determines that the product has been returned to the storing chamber 13 (step S8: YES). The system control unit 23 thus deletes the record of the product information of the product that has been returned (deletes the product information, for example, from the list of the products to be settled) (step S9). Then, the process proceeds to step S10. On the other hand, when the system control unit 23 of the management server 2 determines that the product has not been returned to the storing chamber 13 (step S8: NO), the process proceeds to step S10.

In step S10, the system control unit 23 of the management server 2 determines whether or not the closing of the door 12 of the vending machine 1 has been detected. In the vending machine 1, the user confirms, on the display 15, the name, sales price of the product, and the like, that the user has picked up. Subsequently, when the user closes the door 12 to proceed to the settlement process for the product, the open/close detection unit 191 of the vending machine 1 detects the closing of the door 12 of the vending machine 1. Then, the door open/close information indicating the closing of the door 12 is transmitted to the management server 2 via the communication network NW.

Then, when receiving the door open/close information indicating the closing of the door 12 from the vending machine 1, the system control unit 23 of the management server 2 determines that the closing of the door 12 of the vending machine 1 has been detected (step S10: YES). Then, the process proceeds to step S11. In other words, the system control unit 23 serves as the first detection unit and detects the closing of the door of the vending machine 1 based on the door open/close information. On the other hand, when the system control unit 23 of the management server 2 determines that the closing of the door 12 of the vending machine 1 has not been detected (step S10: NO), the process proceeds to step S14.

In step S11, the system control unit 23 of the management server 2 determines whether or not the product information is recorded (e.g., recorded in the list of the products to be settled). When the system control unit 23 of the management server 2 determines that the product information has been recorded (step S11: YES), the settlement processing unit 233 performs the settlement process based on the information for settlement of the authenticated user and the recorded product information (step S12). Then, the process proceeds to step S13. This settlement process requires the user to pay for the amount corresponding to the sales price of the product. On the other hand, when the system control unit 23 of the management server 2 determines that the product information has not been recorded (step S11: NO), the process proceeds to step S13.

In step S13, the vending machine control unit 234 of the management server 2 transmits the lock command of the door 12 to the vending machine 1 via the communication network NW. Then, the process illustrated in FIG. 7 ends. The lock/unlock control unit 194 of the vending machine 1 controls to lock the door 12 in response to the lock command. With this configuration, the door 12 of the vending machine 1 is locked.

In the step S14, a user state detection process is executed. An example of the user state detection process includes the process example 1 illustrated in FIG. 8 and the process example 2 illustrated in FIG. 9, and step S14 may employ any one of the process example 1 and the process example 2. In the process example 1 illustrated in FIG. 8, when the closing of the door 12 is not been detected after the opening of the door 12 is detected, the system control unit 23 of the management server 2 determines whether or not the state (USER-MOVES-AWAY STATE) in which the user has moved away from the vending machine 1 has been detected (step S14a). In the vending machine 1, when the distance that the user has moved away from the vending machine 1 reaches or exceeds a certain distance, the person state detection unit 193 of the vending machine 1 detects the state in which the user has moved away from the vending machine 1, based on, for example, the image data input from the person detection sensor 18c. Then, the moving state information indicating the state in which the user has moved away is transmitted to the management server 2 via the communication network NW.

Then, when receiving, from the vending machine 1, the moving state information indicating the state in which the user has moved away, the system control unit 23 of the management server 2 determines that the state in which the user has moved away has been detected (step S14a: YES). Then, the process proceeds to step S14b. In other words, the system control unit 23 serves as the second detection unit and detects the state in which the user has moved away from the vending machine 1, based on the moving state information.

Incidentally, in step S14a, the system control unit 23 may determine whether or not the state, in which the closing of the door 12 is not detected after the opening of the door 12 is detected, remains for the predetermined period of time or longer, while the user has moved away from the vending machine 1 has been detected. According to this configuration, it is possible to safely complete the settlement process and to flexibly cope with a case that, for example, the user temporarily moves away from the vending machine 1 and then returns to the vending machine 1. Here, the system control unit 23 of the management server 2 determines that the state in which, the closing of the door 12 is not detected, remains for the predetermined period of time or longer when, for example, the timer A2 counts up the set time (e.g., approximately 20 to 40 seconds) (in other words, when the timer A2 has reached the set time as above after the opening of the door 12 is detected). Alternatively, the system control unit 23 of the management server 2 may start a timer B when determining that the state in which the user has moved away has been detected. In this case, the timer B counts from when the state in which the user has moved away is detected. Then, when the timer B reaches the set time, the system control unit 23 determines that the state, in which the closing of the door 12 has not been detected, remains for the predetermined period of time or longer. On the other hand, when the system control unit 23 of the management server 2 determines that the state in which the user has moved away is not detected (step S14a: NO), the process returns to step S6 illustrated in FIG. 7.

In step S14b, the system control unit 23 of the management server 2 determines whether or not the product information is recorded. When the system control unit 23 of the management server 2 determines that the product information has been recorded (step S14b: YES), the settlement processing unit 233 performs the settlement process based on the information for settlement of the authenticated user and the recorded product information (step S14c). Then, the process proceeds to step S14d. On the other hand, when the system control unit 23 of the management server 2 determines that the product information has not been recorded (step S14b: NO), the process proceeds to step S14d.

In step S14d, the vending machine control unit 234 of the management server 2 transmits the close command of the door 12 to the vending machine 1 via the communication network NW. In other words, the vending machine control unit 234 serves as the second control unit and transmits the close command to control to prevent any of the products from being picked up from the storing chamber 13 of the vending machine 1. When receiving the close command from the management server 2, the door drive control unit 195 of the vending machine 1 controls to automatically close the door 12. By this configuration, the door 12 of the vending machine 1 is automatically closed. Next, the vending machine control unit 234 of the management server 2 transmits the lock command of the door 12 to the vending machine 1 via the communication network NW (step S14e). Then, the process illustrated in FIG. 8 ends. Incidentally, when the vending machine control unit 234 receives the door open/close information indicating the closing of the door 12 from the vending machine 1 after transmitting the close command in step S14d to the vending machine 1, and thus determines that the closing of the door 12 has been detected, the vending machine control unit 234 may transmit the lock command of the door 12 to the vending machine 1. The lock/unlock control unit 194 of the vending machine 1 controls to lock the door 12 in response to the lock command. By this configuration, the door 12 of the vending machine 1 is locked.

On the other hand, in the process example 2 illustrated in FIG. 9, a case is assumed where the user eats or drinks the product picked up from the storing chamber 13 on a chair, at a table, or the like, in a location slightly away from the vending machine 1 (on a condition that the state in which the user has moved away is still detected in the location). In this case, the 3D camera may preferably be used as the person detection sensor 18c. In the process example 2 illustrated in FIG. 9 too, when the closing of the door 12 is not been detected after the opening of the door 12 is detected, the system control unit 23 of the management server 2 determines whether or not the state (USER-MOVES-AWAY STATE) in which the user has moved away from the vending machine 1 has been detected (step S14f). In the vending machine 1, when the user moves away from the vending machine 1, the person state detection unit 193 of the vending machine 1 identifies (e.g., identifies the plurality of times) the distance that the user has moved away from the vending machine 1 based on, for example, the image data (including the distance information) input from the person detection sensor 18c. Then, when the identified distance (e.g., the average of the distances identified the plurality of times) reaches or exceeds the predetermined distance (e.g., one meter), the person state detection unit 193 detects the state in which the user has moved away from the vending machine 1. Then, the moving state information indicating the state in which the user has moved away, together with the distance information indicating the distance identified when the state is detected, is transmitted to the management server 2 via the communication network NW.

Then, when receiving, from the vending machine 1, the moving state information indicating the state in which the user has moved away, together with the distance information, the system control unit 23 of the management server 2 determines that the state in which the user has moved away has been detected (step S14f: YES). Then, the process proceeds to step S14g. In this state, the system control unit 23 serves as a distance identification unit and identifies the distance that the user has moved away from the vending machine 1 based on the distance information. On the other hand, when the system control unit 23 of the management server 2 determines that the state in which the user has moved away is not detected (step S14f: NO), the process returns to step S6 illustrated in FIG. 7. In step S14g, the system control unit 23 of the management server 2 determines whether or not the distance indicated by the distance information received (i.e., the distance that the user has moved away) is equal to or greater than X meter(s) (a first predetermined distance) and is less than Y meter(s) (a second predetermined distance). When the system control unit 23 of the management server 2 determines that the distance indicated by the distance information received is equal to or greater than X meter(s) (e.g., one meter) and is not less than Y meter(s) (e.g., five meters), in other words, the distance is equal to or greater than Y meter(s) (step S14g: NO), the process proceeds to step S14i. On the other hand, when the system control unit 23 of the management server 2 determines that the distance indicated by the distance information received is equal to or greater than X meter(s) and is less than Y meter(s) (step S14g: YES), the process proceeds to step S14h.

Here, when the distance is equal to or greater than X meter(s) and less than Y meter(s), the user stays near the vending machine 1 (for example, the user is in the location where the chair or the table is placed). In this case, the user is presumed to have the door 12 in the open state, while moving between the vending machine 1 and the table or the like several times to pick up the product from the storing chamber 13 and place the product on the table. In order to secure such a period of time (on a condition that the period of time is still within a range not deviating from the object to safely complete the settlement process), in step S14h, the system control unit 23 of the management server 2 determines whether or not the state, in which the closing of the door 12 has not been detected, remains for the predetermined period of time or longer. The system control unit 23 repeats this process until eventually determining that the state remains for the predetermined period of time or longer. Here, the system control unit 23 determines that the state, in which the closing of the door 12 is not detected, remains for the predetermined period of time or longer when, for example, the timer A2 counts up the set time (e.g., approximately one to two minutes) (That is, when the timer A2 has reached the set time after the opening of the door 12 is detected). Alternatively, the system control unit 23 of the management server 2 may start a timer B when determining that the state in which the user has moved away has been detected. In this case, the timer B counts from when the state in which the user has moved away is detected. When the timer B reaches the above described set time, the system control unit 23 determines that the state, in which the closing of the door 12 has not been detected, remains for the predetermined period of time or longer.

Then, when the system control unit 23 of the management server 2 determines that the state, in which the closing of the door 12 has not been detected, remains for the predetermined period of time or longer (step S14h: YES), the process proceeds to step S14i. That is, when the distance is equal to or greater than X meter(s) and is less than Y meter(s), the settlement process for the product picked up is performed, on a condition that the state, in which the closing of the door 12 has not been detected, remains for the predetermined period of time or longer. On the other hand, when the distance is equal to or greater than Y meter(s) (e.g., when the user has left the vending machine 1 without closing the door 12), the settlement process for the product picked up is immediately performed, regardless of whether or not the state, in which the closing of the door 12 has not been detected, remains for the predetermined period of time or longer. According to this configuration, it is possible to safely complete the settlement process and to flexibly cope with the case that, for example, the user eats or drinks the product that the user has picked up in the location slightly away from the vending machine 1.

In step S14i, as in step S14b illustrated in FIG. 8, the system control unit 23 of the management server 2 determines whether or not the product information is recorded. When the system control unit 23 of the management server 2 determines that the product information has been recorded (step S14i: YES), as in step S14c illustrated in FIG. 8, the settlement processing unit 233 performs the settlement process based on the information for settlement of the authenticated user and the recorded product information (step S14j). Then, the process proceeds to step S14k. On the other hand, when the system control unit 23 of the management server 2 determines that the product information has not been recorded (step S14j: NO), the process proceeds to step S14k. In step S14k, as in step S14d illustrated in FIG. 8, the vending machine control unit 234 of the management server 2 transmits the close command of the door 12 to the vending machine 1 via the communication network NW. Next, as in step S14e illustrated in FIG. 8, the vending machine control unit 234 of the management server 2 transmits the lock command of the door 12 to the vending machine 1 via the communication network NW (step S14l). Then, the process illustrated in FIG. 9 ends.

As has been described, according to the foregoing embodiment, the settlement processing system S is configured to perform the settlement process for the product picked up by the user based on the information for settlement of the user, when the closing of the door 12 of the vending machine 1 is detected after the opening of the door 12 is detected. In addition, the settlement processing system S is configured to perform the settlement process for the product picked up by the user based on the information for settlement of the user, in a state in which the closing of the door 12 of the vending machine 1 is not detected after the opening of the door 12 is detected, when the state in which the user has moved away from the vending machine 1 is detected. Thus, it is possible to safely complete the settlement process even when the door 12 of the vending machine 1 is not closed for a period of time. Namely, for example, even in the case that the user has left without remembering to close the door 12, above configuration enables the user (that has left) to be prevented from being required to pay for a product picked up by a third party from the storing chamber 13 (i.e., to protect the user).

Moreover, according to the foregoing embodiment, the settlement processing system S is configured to control to prevent any of the products from being picked up from the storing chamber 13, in the case that the settlement process has been performed for the product while the closing of the door 12 of the vending machine 1 is not detected. Thus, for example, even in the case that the user has left without remembering to close the door 12, it is possible not only to safely complete the settlement process but also to prevent the third party from removing any of the products from the storing chamber 13 (i.e., to protect an owner of the vending machine 1).

Figure 10:
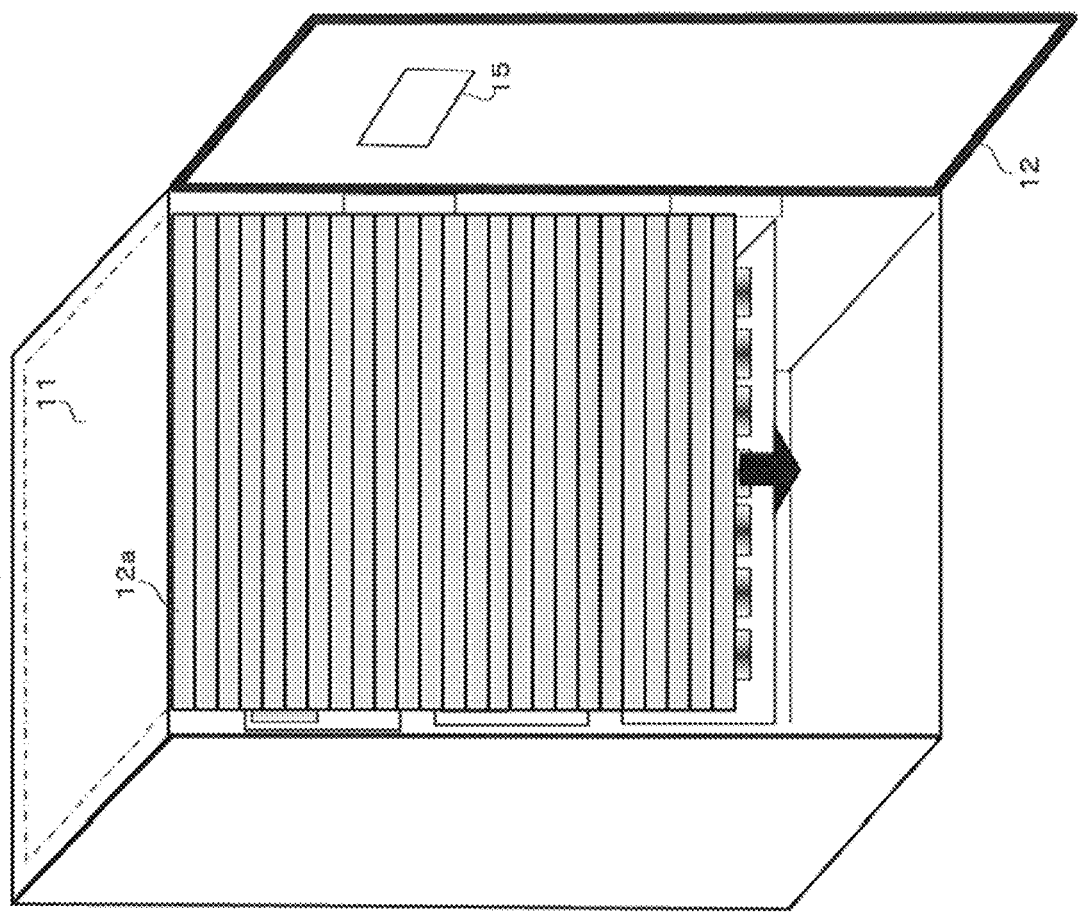
FIG. 10 is an external perspective view of the vending machine 1 that includes an inner door 12*a* provided between the storing chamber 13 and THE DOOR 12.

Incidentally, in the foregoing embodiment, as an example of preventing any of the products from being picked up from the storing chamber 13, the door drive control unit 195 and the door drive mechanism 14 are configured to control to automatically close the door 12. According to this configuration, it is possible to prevent the third party from removing any of the products from the storing chamber 13 without additionally providing any complex mechanism for product removal prevention to the vending machine 1, but the embodiment is not limited to this configuration. For example, the vending machine 1 may be configured to include a product removal prevention mechanism provided on the shelf 13a of the storing chamber 13 or include an inner door provided between the storing chamber 13 and the door 12, so as to prevent any of the products from being picked up. FIG. 10 is an external perspective view of the vending machine 1 including an inner door 12a provided between the storing chamber 13 and the door 12. In the example of FIG. 10, the vending machine 1 further includes an inner door drive mechanism (not illustrated) provided to drive the inner door 12a (e.g., a shutter). In this case, when receiving the close command from the management server 2, the door drive control unit 195 of the vending machine 1 controls to automatically close the inner door 12a by outputting the close control signal to the inner door drive mechanism. For example, the inner door 12a placed in an upper part of the vending machine 1 is lowered in a downward direction (in an arrow direction) of the vending machine 1 by the inner door drive mechanism. According to this configuration, it is possible to prevent the third party from removing any of the products from the storing chamber 13 even in a case that the door 12 of the vending machine 1 cannot be closed for some reason.

Incidentally, it should be noted that the foregoing embodiment is one embodiment of the present invention and does not limit the present invention accordingly; and any change, addition, or modification of the foregoing embodiment appropriately made within the spirit of the present invention will naturally fall within the technical scope of the present invention. For example, in the foregoing embodiment, the management server 2 is configured to perform the settlement process for each product, but alternatively, the vending machine 1 may be configured to perform the settlement process for the product. In this case, the vending machine 1 functions as the settlement processing device, and the system control unit 19 functions as the information acquisition unit, the first settlement processing unit, and the second settlement processing unit to execute the process illustrated in FIG. 6, while cooperating with the management server 2 via communication.

REFERENCE SIGNS LIST

1 Vending machine
2 Management server
3 Mobile terminal
11 main body
12 Inner door
13 Open space
14 Storing chamber
15 Door drive mechanism
16 Communication unit
17 Storage unit
18 Sensor unit
19 System control unit
21 Communication unit
22 Storage unit
23 System control unit
191 Open/close detection unit
192 Product identification unit
193 Person state detection unit
194 Lock/unlock control unit
195 Door drive control unit
196 Display control unit
231 Authentication processing unit
232 Information acquisition unit
233 Settlement processing unit
234 Vending machine control unit
S Settlement processing system
NW Network

The invention claimed is:

1. A settlement processing system comprising:
at least one memory configured to store program code; and at least one processor configured to access the program code and operate as instructed by the program code, the program code including:
first detection code configured to cause at least one of the at least one processor to detect an opening or a closing of a door of a vending machine, the vending machine including a storing chamber that stores a product;
product identification code configured to cause at least one of the at least one processor to identify the product that is picked up by a user from the storing chamber after the opening of the door is detected;
second detection code configured to cause at least one of the at least one processor to detect a state in which the user has moved away from the vending machine, in a state in which the closing of the door is not detected after the opening of the door is detected;
information acquisition code configured to cause at least one of the at least one processor to acquire information for settlement of the user;
first settlement processing code configured to cause at least one of the at least one processor to perform a settlement process for the identified product based on the information for settlement of the user, in a case that the closing of the door is detected after the opening of the door is detected; and
second settlement processing code configured to cause at least one of the at least one processor to perform a settlement process for the identified product based on the information for settlement of the user, in a case that the state in which the user has moved away is detected.

2. The settlement processing system according to claim 1, wherein
the second settlement processing code causes at least one of the at least one processor to perform the settlement process for the identified product, in a case that the state, in which the closing of the door is not detected after the opening of the door is detected, remains for a predetermined period of time or longer, and the state in which the user has moved away is detected.

3. The settlement processing system according to claim 1, the program code further including:
  distance identification code configured to cause at least one of the at least one processor to identify a distance that the user has moved from away the vending machine, wherein
  in a case that the identified distance is equal to or greater than a first predetermined distance and is less than a second predetermined distance, the second settlement processing code causes at least one of the at least one processor to perform the settlement process for the identified product, on a condition that the state, in which the closing of the door is not detected, remains for a predetermined period of time or longer, and
  in a case that the identified distance is equal to or greater than the second predetermined distance, the second settlement processing code causes at least one of the at least one processor to perform the settlement process for the identified product, regardless of whether or not the state, in which the closing of the door is not detected, remains for the predetermined period of time or longer.

4. The settlement processing system according to claim 1, the program code further including:
  authentication processing code configured to cause at least one of the at least one processor to perform an authentication process for a user that uses the vending machine when the door is in a locked state; and
  first control code configured to cause at least one of the at least one processor to control to unlock the door in a case that the user is authenticated, wherein
  each of the first settlement processing code and the second settlement processing code configured to cause at least one of the at least one processor to perform the settlement process for the identified product, based on information for settlement of the authenticated user.

5. The settlement processing system according to claim 1, the program code further including:
  second control code configured to cause at least one of the at least one processor to control to prevent the product from being picked up from the storing chamber, in a case that the settlement process for the product is performed in the state in which the closing of the door is not detected.

6. The settlement processing system according to claim 5, wherein
  the second control code causes at least one of the at least one processor to control to automatically close the door based on a drive mechanism including a motor.

7. The settlement processing system according to claim 5, wherein
  the second control code causes at least one of the at least one processor to control to automatically close an inner door that is provided between the storing chamber and the door, based on a drive mechanism including a motor.

8. A settlement processing device comprising:
  at least one memory configured to store program code; and at least one processor configured to access the program code and operate as instructed by the program code, the program code including:
  first detection code configured to cause at least one of the at least one processor to detect an opening or a closing of a door of a vending machine, the vending machine including a storing chamber that stores a product;
  product identification code configured to cause at least one of the at least one processor to identify the product that is picked up by a user from the storing chamber after the opening of the door is detected;
  second detection code configured to cause at least one of the at least one processor to detect a state in which the user has moved away from the vending machine, in a state in which the closing of the door is not detected after the opening of the door is detected;
  information acquisition code configured to cause at least one of the at least one processor to acquire information for settlement of the user;
  first settlement processing code configured to cause at least one of the at least one processor to perform a settlement process for the identified product based on the information for settlement of the user, in a case that the closing of the door is detected after the opening of the door is detected; and
  second settlement processing code configured to cause at least one of the at least one processor to perform a settlement process for the identified product based on the information for settlement of the user, in a case that the state in which the user has moved away is detected.

9. A settlement processing method executed by one or more computers, the settlement processing method including:
  detecting an opening or a closing of a door of a vending machine, the vending machine including a storing chamber that stores a product;
  identifying the product that is picked up by a user from the storing chamber after the opening of the door is detected;
  detecting a state in which the user has moved away from the vending machine, in a state in which the closing of the door is not detected after the opening of the door is detected;
  acquiring information for settlement of the user;
  performing a settlement process for the product identified based on the information for settlement of the user, in a case that the closing of the door is detected after the opening of the door is detected; and
  performing a settlement process for the product identified based on the information for settlement of the user, in a case that the state in which the user has moved away is detected.

* * * * *